No. 643,758. Patented Feb. 20, 1900.
F. R. BLAKE.
STARTING BOX AND CONTROLLER FOR ELECTRIC MOTORS.
(Application filed Dec. 8, 1899.)
(No Model.) 2 Sheets—Sheet 1.
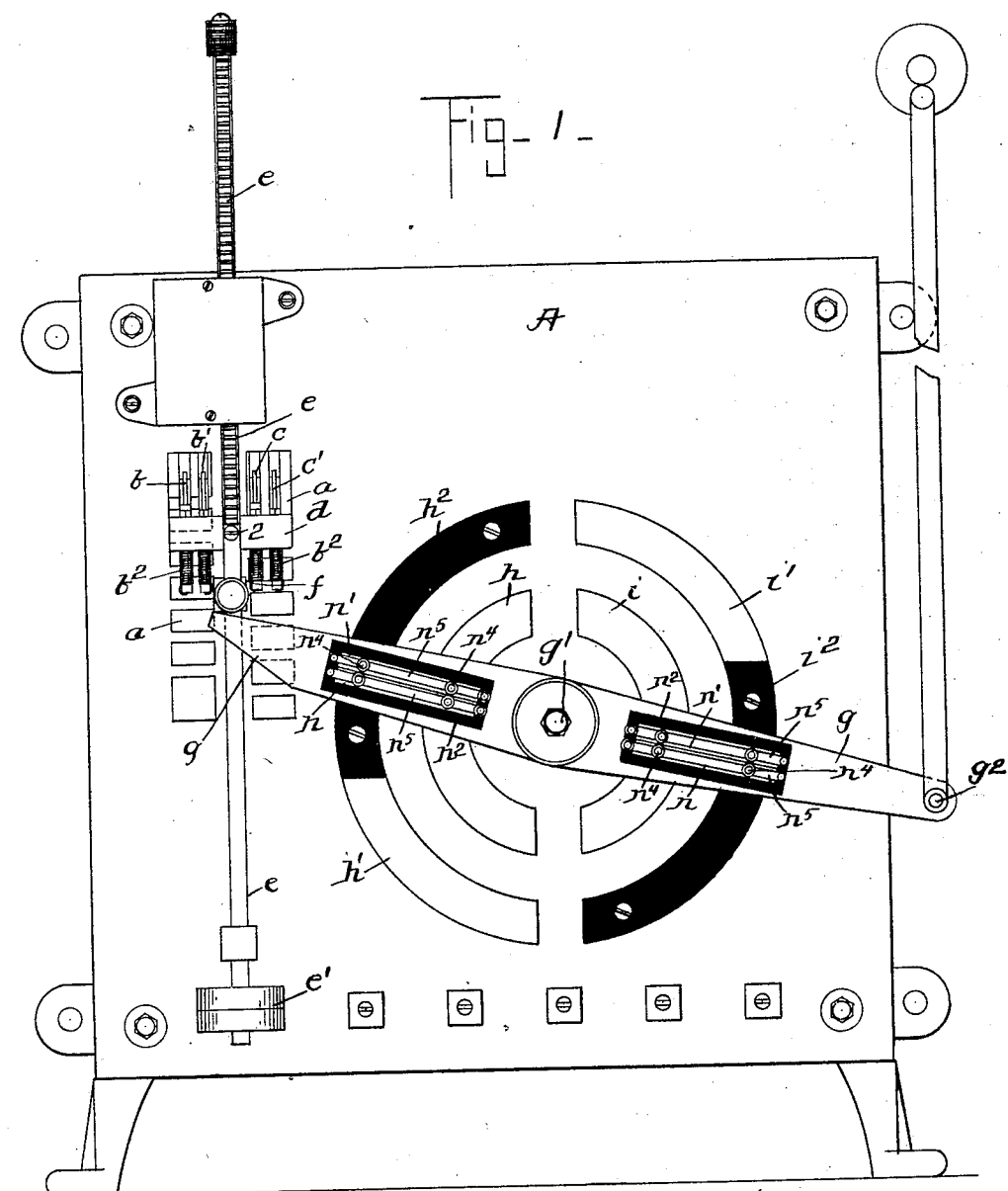
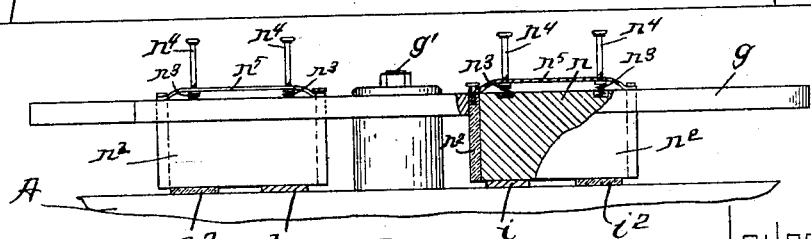
Witnesses:
H. B. Davis
J. L. Hutchinson
Inventor:
Frank R. Blake
by B. J. Noyes
atty.
THE NORRIS PETERS CO., PHOTO-LITHO., WASHINGTON, D. C.

No. 643,758. Patented Feb. 20, 1900.
F. R. BLAKE.
STARTING BOX AND CONTROLLER FOR ELECTRIC MOTORS.
(Application filed Dec. 8, 1899.)
(No Model.) 2 Sheets—Sheet 2.
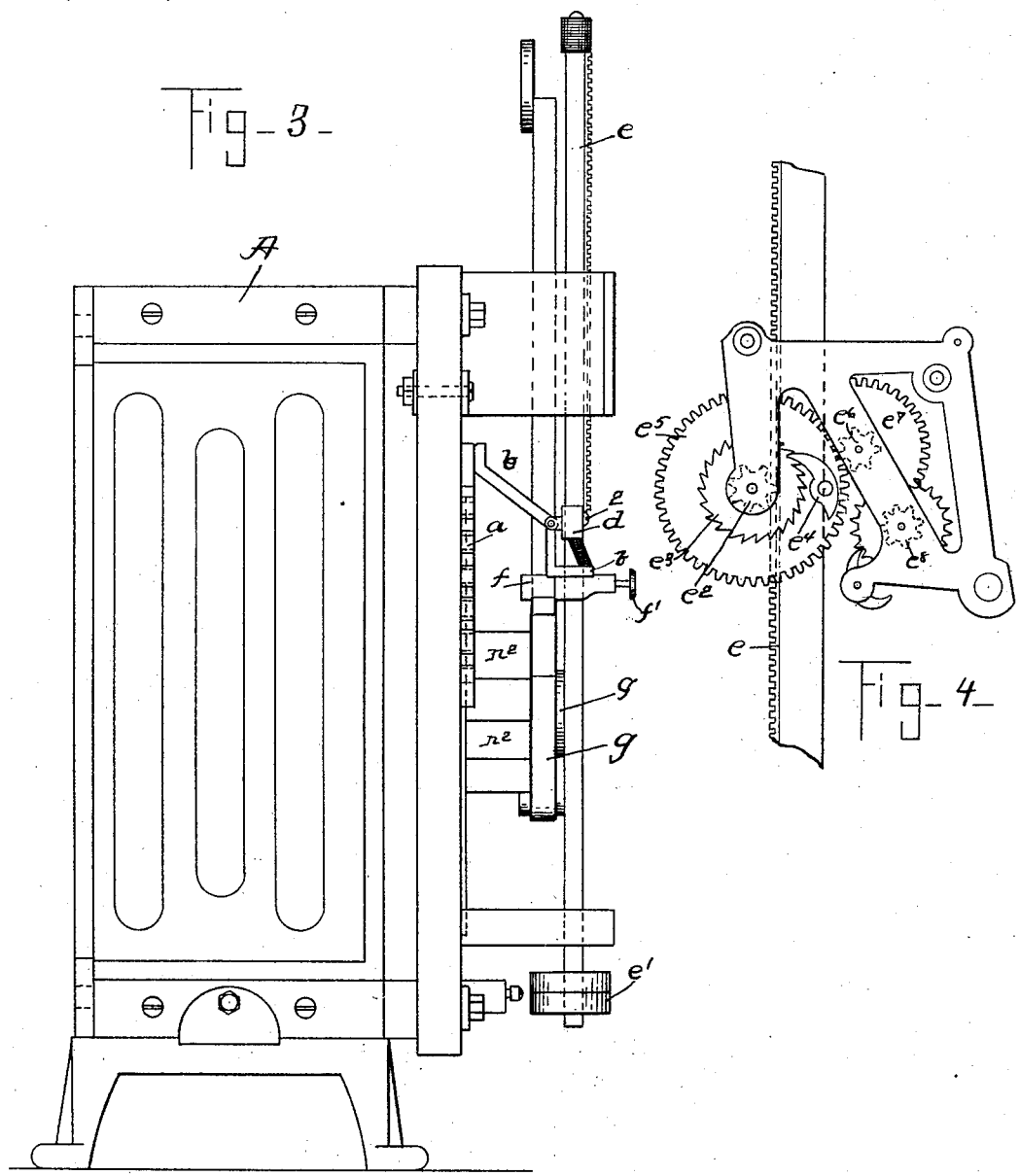
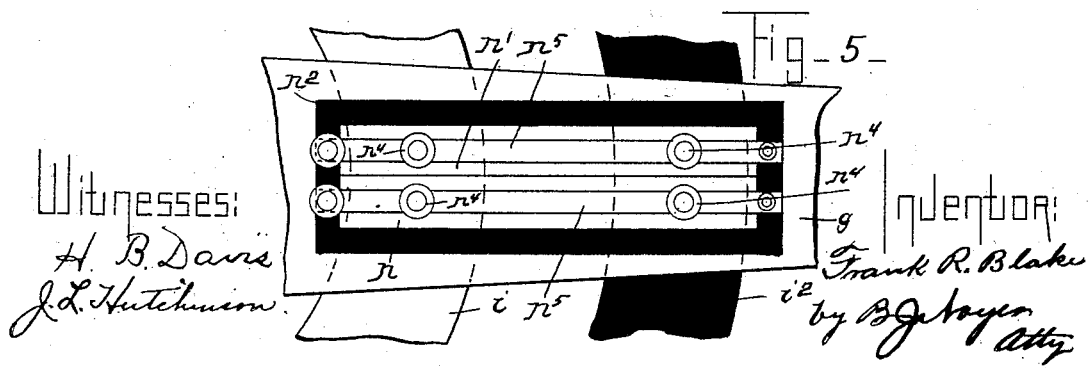
Witnesses:
H. B. Davis
J. L. Hutchinson
Inventor:
Frank R. Blake
by B. J. Noyes
Atty

UNITED STATES PATENT OFFICE.

FRANK R. BLAKE, OF BOSTON, MASSACHUSETTS.

STARTING-BOX AND CONTROLLER FOR ELECTRIC MOTORS.

SPECIFICATION forming part of Letters Patent No. 643,758, dated February 20, 1900.

Application filed December 8, 1899. Serial No. 739,699. (No model.)

*To all whom it may concern:*

Be it known that I, FRANK R. BLAKE, of Boston, county of Suffolk, and State of Massachusetts, have invented an Improvement in Starting-Boxes and Controllers for Electric Motors, of which the following description, in connection with the accompanying drawings, is a specification, like letters and figures on the drawings representing like parts.

This invention has for its object to improve and simplify the construction of a starting-box and controller for electrtc motors, being especially adapted for use in connection with electric motors employed for operating elevators. Such an apparatus usually comprises a resistance-box and a switch for the circuit of the motor; and my invention consists in novel means of cutting out the resistances, also in a novel form of switch for operating the circuit of the motor, and also in connections whereby the means employed for cutting out the resistances shall be operated by said novel form of switch, all as will be hereinafter more particularly set forth.

Figure 1 shows in front elevation a starting-box and controller for electric motors embodying this invention. Fig. 2 is an edge view and partial section of the switch-arm which controls the circuit of the electric motor. Fig. 3 is a side elevation of the starting-box and controller shown in Fig. 1. Fig. 4 is a detail of an escapement mechanism for controlling the movement of a rack-bar bearing the contact-fingers which coöperate with the plates of the resistance-box, and Fig. 5 an enlarged side view of a portion of the switch-arm of the switch which controls the circuit of the motor.

The box or case A is of any suitable size and shape and contains any usual resistance-coils, which it is not deemed necessary to herein illustrate in detail. $a$ represents the plates connected with said resistance-coils and which are herein referred to as "resistance-plates." There will be any number of resistance-plates provided, as may be desired, and they will be made of any suitable shape and size and disposed relatively to each other in any desirable manner.

Two pairs of contact-fingers $b$ $b'$ $c$ $c'$ are provided which are adapted to coöperate with said resistance-plates, they being herein shown as separately pivoted at 2 to a cross-bar $d$, which is secured to a vertically-disposed rack-bar $e$, which is made of any suitable length and provided with suitable guides on the box A, by which its up-and-down movements may be guided. The pivoted contact-fingers have suitable projections or extensions, to the extremities of which spiral springs $b^2$ are connected, the opposite ends of said springs being connected to the said cross-bar $d$ or to any other fixed support. The springs $b^2$ serve to press the contact-fingers into engagement with the resistance-plates, holding them firmly yet yieldingly in contact therewith. The rack-bar $e$ has attached to it a suitable weight $e'$, by means of which it will be caused to descend when permitted so to do. The descending movement of the rack-bar $e$ is retarded to a certain extent in order that the several resistance-plates may be successively connected slowly, and as a simple and efficient form of retarding device by which this result may be accomplished I have provided an escapement mechanism, consisting of a pinion $e^2$, which is adapted to be engaged by the teeth of the rack-bar $e$, a ratchet-wheel $e^3$, secured to the shaft of said pinion $e^2$, a pawl $e^4$, which is engaged by said ratchet-wheel, a toothed wheel $e^5$, bearing said pawl, loosely mounted on the shaft which bears said ratchet-wheel, a pinion $e^6$, engaged by said toothed wheel $e^5$, a toothed wheel $e^7$, secured to the shaft bearing said pinion, a pinion $e^8$, which is engaged by said toothed wheel $e^7$, which is secured to a shaft or arbor bearing an escape-wheel with which coöperates any usual or suitable pallet.

By providing a weight which is adapted to serve as the actuator of the descending rack-bar and controlling its descending movement by means of an escapement mechanism, substantially as herein described, it will be observed that such movement of the rack-bar is positive and liability of stopping at any intermediate point is reduced to the minimum.

The rack-bar $e$ has secured to it, preferably adjustably, a rearwardly-extended projection or stud $f$, the position of which on the rack-bar may be regulated by the adjusting-screw $f'$, and a lever is provided for engaging said projection $f$ to lift the rack-bar and its attached weight to its most elevated position and hold it in such position. The switch-arm $g$ of the circuit-switch of the motor, to be described, is employed as the actuating-lever for engaging the projection $f$. The switch-arm $g$ is pivoted at $g'$ and operates the contact-brushes which coöperate with the contact-plates of the switch, and said arm $g$ is connected by a link $g^2$ with any usual sheave, which may be operated in any usual or suitable manner, so that whenever said switch-arm is turned on its pivot in one direction to operate the circuit of the motor the rack-bar $e$ will be released and permitted and caused to descend by means of the weight, its descending movement being controlled and retarded more or less by the escapement mechanism, and whenever said switch-arm $g$ is turned in the opposite direction said rack-bar will be restored.

The switch-arm $g$ is provided with two pairs of brushes, or it may be with two brushes only, adapted to coöperate with concentrically-arranged segmental plates located beneath the arm. As herein shown, there are two pairs of segmental plates $h\ h'\ i\ i'$, one pair for each side of the line, and a single insulated segmental plate $h^2\ i^2$ forms an extension of one of the segmental plates of each pair. These segmental plates are disposed concentrically and the switch-arm $g$ pivoted between the respective pairs of plates.

The brushes borne by the switch-arm $g$ each consists of a copper and a carbon block $n\ n'$, loosely supported in a shell or case $n^2$, of insulating material, set into a hole formed in the arm $g$, and two such brushes are provided, one at each side of the pivot of said arm $g$, and said copper and carbon blocks in each shell or case $n^2$ are located side by side and are adapted to be yieldingly pressed down onto the segmental plates by springs $n^3$, the pressure of which is regulated by adjusting-screws $n^4$ passing through threaded holes in plates $n^5$, secured to the arm $g$.

I claim—

1. In a device of the kind described, the combination of a circuit-switch for the motor, a rack-bar bearing contact-fingers which coöperate with the resistance-plates, a retarding device for said rack-bar which controls its movement in one direction, a weight for moving said rack-bar in its retarded direction, and connections whereby said rack is moved in the opposite direction by the means employed for operating said circuit-switch, substantially as described.

2. In a device of the kind described, the combination of a circuit-switch for the motor, a rack-bar bearing contact-fingers which coöperate with the resistance-plates, a retarding device for said rack-bar which controls its movement in one direction, a weight for moving said rack-bar in its retarded direction, a projection on said rack-bar adapted to be engaged by the actuating-arm of said circuit-switch to be moved by said arm in the opposite direction, substantially as described.

3. In a device of the kind described, the combination of a circuit-switch for the motor, a rack-bar bearing contact-fingers which coöperate with the resistance-plates, escapement mechanism for retarding the movement of said rack-bar in one direction, a weight for moving said rack-bar in its retarded direction and connections whereby said rack-bar is moved in the opposite direction by the means employed for operating said circuit-switch, substantially as described.

4. In a device of the kind described, the combination of a circuit-switch for the motor, a rack-bar bearing pivoted spring-pressed contact-fingers which coöperate with the resistance-plates, a retarding device for said rack-bar which controls its movement in one direction, a weight for moving said rack-bar in its retarded direction, and connections whereby said rack-bar is moved in the opposite direction by the means employed for operating said circuit-switch, substantially as described.

5. In a device of the kind described, the combination of a circuit-switch for the motor comprising a number of concentrically-arranged segmental plates and a pivoted switch-arm bearing a number of contact-fingers adapted to coöperate with said segmental plates, means for turning said switch-arm on its pivot, a resistance-box having a number of plates, contact-fingers coöperating with said plates, retarded operating mechanism for moving said contact-fingers over said plates in one direction slowly to cut out the resistances, and connections whereby said contact-fingers are moved in the opposite direction and said retarded operating mechanism reset by said switch-arm, substantially as described.

6. In a device of the kind described, the combination of a circuit-switch for the motor comprising a number of concentrically-arranged segmental plates, a pivoted switch-arm bearing a number of contact-fingers, means for turning said switch-arm, a resistance-box having a number of plates, contact-fingers coöperating with said plates, a rack-bar bearing said contact-fingers, escapement mechanism for retarding the movement of said rack-bar in one direction, a weight for moving said rack-bar in its retarded direction, a projection on said rack-bar adapted to be engaged by said switch-arm for moving said rack-bar in the opposite direction, substantially as described.

7. In a device of the kind described, a circuit-switch for a motor comprising a number of contact-plates and a switch-arm bearing yieldingly-supported copper and carbon brushes located side by side and insulated from said switch-arm, substantially as described.

8. In a device of the kind described, a circuit-switch for a motor comprising two pairs of segmental contact-plates disposed concentrically, and a pivoted switch-arm bearing yieldingly-supported copper and carbon brushes located side by side and insulated from said switch-arm, substantially as described.

In testimony whereof I have signed my name to this specification in the presence of two subscribing witnesses.

FRANK R. BLAKE.

Witnesses:
CHARLES SPRAGUE,
B. J. NOYES.